(12) United States Patent
Sheidler et al.

(10) Patent No.: US 7,748,489 B2
(45) Date of Patent: Jul. 6, 2010

(54) AGRICULTURAL HEADER PRESENCE SENSOR WITH TRACTION CONTROL

(75) Inventors: Alan Sheidler, Moline, IL (US); Johann Pierce, DeWitt, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/262,901

(22) Filed: Oct. 31, 2008

(65) Prior Publication Data
US 2010/0107584 A1 May 6, 2010

(51) Int. Cl.
*B60K 7/00* (2006.01)
*B60K 17/14* (2006.01)

(52) U.S. Cl. .................... 180/308; 180/307; 180/242; 701/50

(58) Field of Classification Search ............ 701/50; 180/305, 308, 242, 307; 60/712; 56/10.2 R, 56/14.9, 11.1, 14.4; 460/1
See application file for complete search history.

(56) References Cited

U.S. PATENT DOCUMENTS

| | | | | | |
|---|---|---|---|---|---|
| 1,763,265 | A | * | 6/1930 | Sharp | 56/11.1 |
| 4,009,556 | A | * | 3/1977 | Molzahn | 56/10.7 |
| 5,878,557 | A | * | 3/1999 | Wyffels et al. | 56/13.5 |
| 6,073,428 | A | * | 6/2000 | Diekhans | 56/10.2 R |
| 6,167,337 | A | * | 12/2000 | Haack et al. | 701/50 |
| 6,397,571 | B1 | * | 6/2002 | Ehrecke | 56/10.2 R |
| 6,513,311 | B1 | * | 2/2003 | Berger et al. | 56/10.2 R |
| 6,519,923 | B1 | * | 2/2003 | Cooksey et al. | 56/14.9 |
| 6,591,591 | B2 | * | 7/2003 | Coers et al. | 56/10.2 G |
| 7,022,012 | B2 | * | 4/2006 | Heinsey et al. | 460/2 |
| 7,044,257 | B2 | | 5/2006 | Kempf et al. | |
| 7,121,374 | B1 | * | 10/2006 | Ho et al. | 180/242 |
| 7,172,046 | B2 | * | 2/2007 | Ho et al. | 180/242 |
| 7,357,214 | B2 | * | 4/2008 | Ho et al. | 180/307 |
| 7,487,024 | B2 | * | 2/2009 | Farley et al. | 701/50 |
| 2005/0217261 | A1 | | 10/2005 | Hofer | |
| 2006/0211535 | A1 | | 9/2006 | Casey | |
| 2009/0005939 | A1 | * | 1/2009 | Dueckinghaus et al. | 701/50 |
| 2009/0241499 | A1 | * | 10/2009 | Maertens et al. | 56/11.1 |

FOREIGN PATENT DOCUMENTS

EP 1488676 B1 6/2004

* cited by examiner

*Primary Examiner*—Árpád Fábián-Kovács
(74) *Attorney, Agent, or Firm*—Taylor & Aust, P.C.

(57) ABSTRACT

An agricultural combine for supporting an agricultural header and carrying that agricultural header to a field to harvest a crop. The combine includes a chassis, front and rear drive wheels, a hydraulic motor, a device for sensing and a controller. The front and rear drive wheels support the chassis. The hydraulic motor is drivingly coupled to the front wheels. The device for sensing senses a presence of a header mounted to the combine. The controller is configured to monitor the device for sensing and to change the specific displacement of the hydraulic motor dependent upon the presence of the agricultural header.

18 Claims, 2 Drawing Sheets

AGRICULTURAL HEADER PRESENCE SENSOR WITH TRACTION CONTROL

FIELD OF THE INVENTION

This invention relates to agricultural vehicles, and, more particularly to systems and methods for balancing the torque on combine drive wheels.

BACKGROUND OF THE INVENTION

A typical agricultural combine weighs 15,000-20,000 kg. Combines are designed to support headers mounted to the front of the combine, which extend forward as a cantilevered load. Agricultural headers for such combines typically weigh 2000-5000 kg. The header weight, therefore, can be as much as ⅓ the weight of the combine itself. Unlike work vehicles, such as front loaders, headers for combines extend substantially beyond the left and right sides of the combine, having a total width of 10-15 m.

To compensate for the extremely large cantilevered loads applied by the header to the combine, the combine itself is usually provided with two large front drive wheels disposed on either side of the front of the combine, and two much smaller drive wheels disposed on either side of the rear of the combine.

Agricultural combines are typically configured to permit the use of different headers depending upon the type of crop to be harvested. Agricultural combines are equipped with fasteners that permit the different headers to be quickly connected and disconnected from the front of the combine. Headers are not required, however, to operate an agricultural combine. They're only necessary for harvesting crops.

Due to the great weight of the header, the machine dynamics change radically depending on whether the header is installed or removed, and even when a very heavy header is replaced with a very light header (or vice versa). The radical change in total weight and weight distribution will, depending on the configuration, cause the combine to be more prone wheel slippage.

Traction may be controlled in construction vehicles with front loading cantilevered buckets according to one system described in US patent application publication No. US2006/0211535 A1, by using a payload sensor to measure the weight of the payload in the bucket.

In EP 1 488 676 B1, traction may be controlled in a forage combine by changing the spacing between the front and rear wheels based upon the weight of the harvesting header.

In U.S. Pat. No. 7,044,257, it is disclosed that traction may be controlled in an agricultural combine by using wheel speed sensors to measure wheel slippage while the vehicle is being driven through the field, and to change the displacement of hydraulic motors driving those wheels to reduce the relative speed of the slipping wheel.

In US patent application publication US 2005/0217261 A1, traction may be controlled in a working vehicle by monitoring the rotational speeds of the front and rear wheels using speed sensors, calculating the diameter of the wheels, and varying the specific displacement of the hydraulic motors driving those wheels in accordance with rotational speeds.

None of the above examples balances the torque applied by each of the wheels based on the presence or absence of an implement on the vehicle, are on the type of implement on the vehicle. It is an object of this invention to provide such a system.

SUMMARY OF THE INVENTION

The present invention provides a traction control system for an agricultural vehicle, and more particularly to an agricultural harvester.

The invention in one form is directed to an agricultural combine for supporting an agricultural header and carrying that agricultural header to a field to harvest a crop. The combine includes a chassis, front and rear drive wheels, a hydraulic motor, a device for sensing and a controller. The front and rear drive wheels support the chassis. The hydraulic motor is drivingly coupled to the front wheels. The device for sensing senses a presence of a header mounted to the combine. The controller is configured to monitor the device for sensing and to change the specific displacement of the hydraulic motor dependent upon the presence of the agricultural header.

The invention in another form is directed to a control system for an agricultural combine that carries an agricultural header. The combine includes a chassis with front drive wheels and rear wheels coupled to the chassis. The combine has a hydraulic motor drivingly coupled to the front wheels. The control system includes a device for sensing and a controller. The device for sensing senses a presence of the agricultural header mounted to the combine. The controller is configured to monitor the device for sensing and to change the specific displacement of the hydraulic motor dependent upon the presence of the agricultural header.

DETAILED DESCRIPTION OF THE INVENTION

Figure 1:
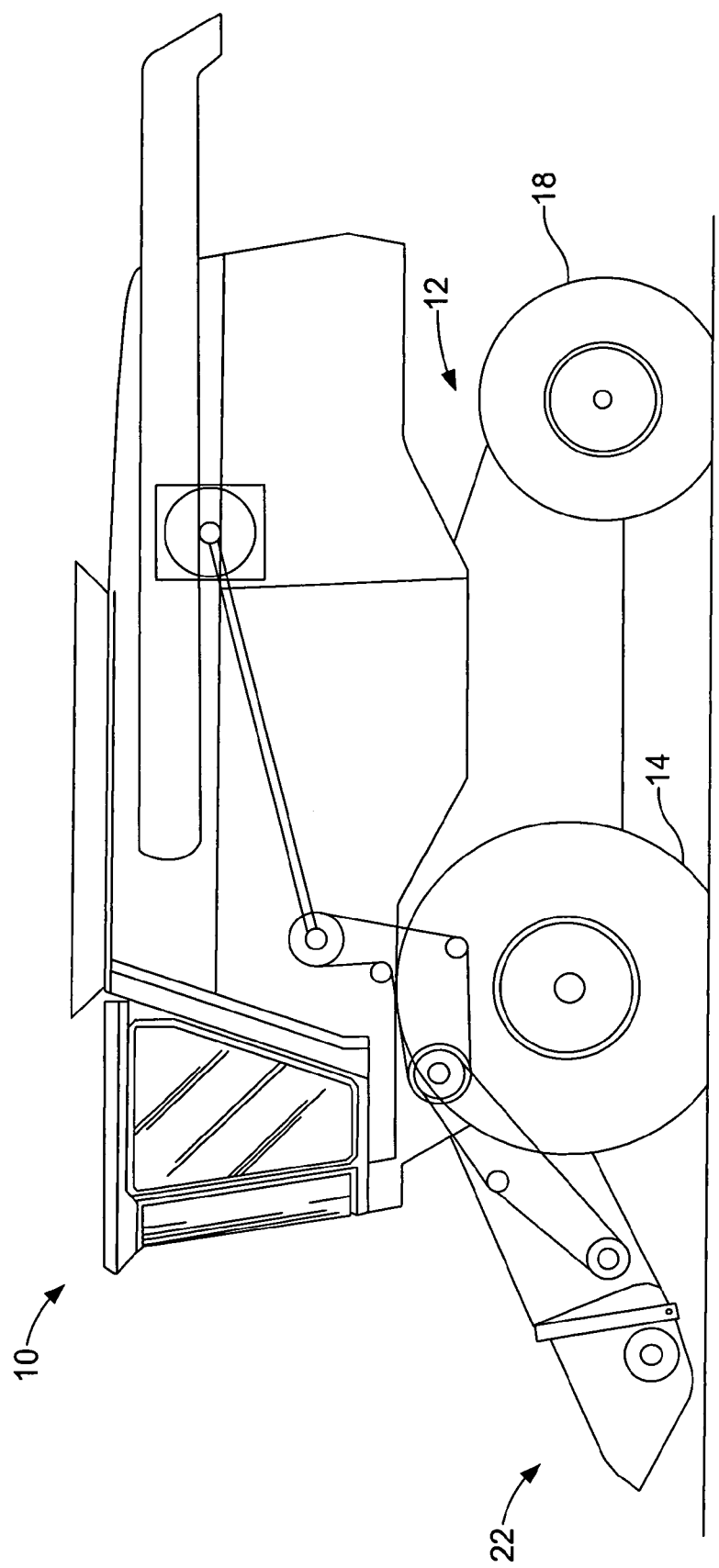
FIG. 1 is a side view of a ground-engaging vehicle, in the form of a combine that utilizes an embodiment of the control system of the present invention.
Figure 2:
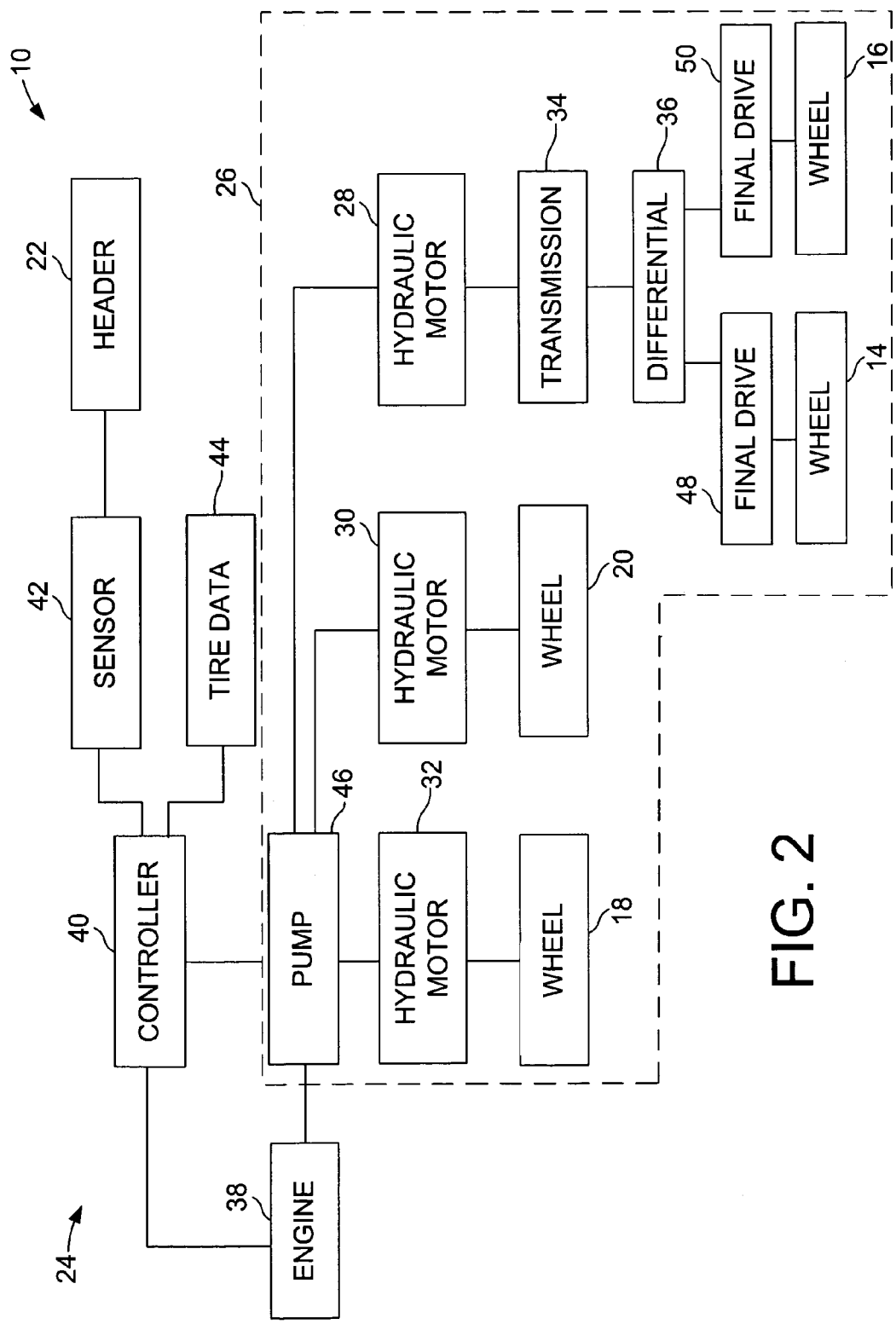
FIG. 2 is a schematicized diagram illustrating the interconnection of portions of the control system used in the combine of FIG. 1.

Referring now to the drawings, and more particularly to FIGS. 1 and 2 there is shown a harvester 10 including a chassis 12, front wheels 14 and 16, rear wheels 18 and 20, a header 22 and a control system 24.

Control system 24 interacts with elements of a drive system 26 that incorporates hydraulic motors 28, 30 and 32, as well as a transmission 34 and a differential 36. Power is transferred from differential 36 through final drives 48 and 50, respectively to wheels 14 and 16. Hydraulic motors 28, 30 and 32 are driven by an engine 38 by way of a hydraulic pump 46. A controller 40 interacts with a sensor 42 and with tire data 44 in order to coordinate actions of drive system 26. Harvester 10 is a self-propelled vehicle 10 including chassis 12 to which is connected to the elements of drive system 26.

Hydraulic motors 28, 30 and 32 each are a variable displacement hydraulic motor. Hydraulic motor 32 is coupled to left rear wheel 18 and hydraulic motor 30 is coupled to right rear wheel 20. Engine 28 is coupled to and drives a variable displacement main hydraulic pump 46, which in turn supplies fluid to and drives hydraulic motors 28, 30 and 32. Hydraulic motor 28 drives a multi-speed transmission 34, which in turn drives a differential gear box 36, which in turn is coupled to final drives 48 and 50, which respectively drive wheels 14 and 16.

Controller 40 is illustrated, for ease of understanding, as being a separate controller connected to elements of drive system 26, but the functions of controller 40 may be implemented in a controller that performs other control functions for combine 10. The functions discussed herein may be implemented within an electronic control unit associated with control systems contained in agricultural harvester 10. The implementation of the system and method described herein may be in the form of an algorithm, hardware or a combination of algorithms and hardware utilized by the electronic control unit or a separate controller.

Control system 24 is configured to receive signals from sensor 42, which indicates the presence or absence of an agricultural header 22. Additionally, sensor 42 will sense the type of header 22 that is connected to chassis 12. For example, if header 22 is a cornhead having a predetermined number of row units, the weight of that cornhead is known by controller 40 to be utilized by the method described herein. Additionally, if header 22 is a small grain header, the weight thereof is also known, by way of data that has been entered and is stored as a value that is accessed by controller 40.

Tire configuration data stored in memory 44 is available to controller 40 as an additional input for use by the method carried out by control system 24. Tire configuration data will include the size of the installed tires as well as other duals installed on harvester 10. This information is input by the operator or maintenance personnel.

Controller 40 coacts with drive system 26 which are together configured to vary the specific displacement of hydraulic pump 46 as well as hydraulic motors 28, 30 and 32. The variation of the specific displacements of pump 46 and motors 28, 30, and 32 is in response to signals received from sensor 42 as well as tire configuration data 44.

Sensor 42 may be disposed adjacent to header 22 to sense the presence and the type of agricultural header 22, by sensing characteristics of the header that indicate its presence or absence and its type, if installed. Sensor 42 may be one, or more switches that make contact with a physical portion of agricultural header 22 and are coupled to harvester 10. Alternatively, sensor 42 may be a manual or automatic connection that is engaged either manually or automatically when header 22 is coupled to harvester 10. Alternatively, sensor 42 can be a proximity sensor, such as a Hall Effect device or an RFID tag reader with an RFID tag connected to header 22. Sensor 42 may have an electrical or magnetic field sensing device or even a light sensor configured to sense the presence or absence of light when header 22 is connected or disconnected from harvester 10.

Sensor 42 may be disposed on the feeder house of harvester 10 and make physical contact with structures in header 22 when header 22 is physically engaged to the feeder house. The structures may include electrical connections, switches, light sources, hydraulic or electrical couplings, or integrated circuits that indicate the presence, absence or type of header when they interact with sensor 42. Different types of header 22 may have different structures that interact differently with sensor 42 in order to convey information to sensor 42 relative to the header type as well as the presence or the absence thereof.

Alternatively, sensor 42 may be configured to be manipulated by the operator of the vehicle when the operator attaches agricultural header 22 to combine 10. This manipulation may include making a mechanical, an electrical, a pneumatic or hydraulic connection or connections between combine 10 and agricultural header 22. These manipulations may be required for the coupling of header 22 to combine 10 in order for it to properly function and the sensing of these couplings is undertaken by sensor 42.

Control system 24 is configured to periodically monitor the status of sensor 42 to determine whether or not agricultural header 22 is supported on the feeder house of combine 10 and to query the type of header that is attached. This polling is preferably done at least when the self-propelled vehicle 10 is started up and control system 24 is energized. This ensures that any changes made while combine 10 was shut down are immediately sensed before the vehicle is driven away. It may also be undertaken at intervals while combine 10 is being operated.

Control system 24, and more particularly controller 40, stores internally at least two different values, one value representing the specific displacement requirements of hydraulic motor 28 when header 22 is attached to combine 10, and one value representing the specific displacement requirements of hydraulic motor 28 when header 22 is removed from combine 10. Additionally, control system 24 internally stores one or more additional values that represent specific displacement requirements of hydraulic motor 28 when an agricultural header 22 of a different type is attached. Agricultural headers 22 of different types may incorporate different switches, different electrical contacts, different integrated circuits, different jumpers, different generators of electromagnetic signals or lights or other similar information conveying devices, any of which can be configured to signal sensor 42 when a header of a different type has been attached to combine 10.

When control system 24 senses the presence, absence and/or type of agricultural header 22 by monitoring sensor 42, control system 24 is then configured to use the sensed status to look up the corresponding values indicating appropriate specific displacements by hydraulic motors 28, 30 and 32. Control system 24 then adjusts the displacement to appropriately provide power to wheels 14, 16, 18 and 20. The weight that is cantilevered over the front of combine 10 alters the amount of weight that is applied to wheels 14 and 16 considerably. Wheels 14 and 16 bear the main load of combine 10 and the torque applied to wheels 14 and 16 has to be appropriately balanced as is the torque supplied to wheels 18 and 20 to provide balanced traction for combine 10.

Typically control system 24 is configured to increase the specific displacement of hydraulic motor 28 when agricultural header 22 is removed. Removal of header 22 as detected by sensor 42 is passed on to controller 40 and indicates that no header is attached to combine 10. By increasing the displacement, the torque applied to the ground by front wheels 14 and 16 is reduced. At the same time, the specific displacement of hydraulic motors 30 and 32 that drive rear wheels 18 and 20 is unchanged or reduced by control system 24. This effectively reduces the front to rear torque ratio applied to the ground by the front and rear wheels.

In a similar fashion, control system 24 is configured to decrease the specific displacement of hydraulic motor 28 when agricultural header 22 is attached to vehicle 10. By decreasing the displacement based on the presence of header 22 and additionally the type of header 22, this gives controller 40 the information to apply appropriate torque to wheels 14, 16, 18 and 20. Control system 24 may adjust displacement of hydraulic motor 28 leaving the displacement of hydraulic motors 30 and 32 unchanged or may adjust the displacements of each to correspond to the weight distribution of combine 10.

Control system 24 is configured to increase and decrease specific displacements of motors 28, 30 and 32 as well as the displacement of the pump to effectively control the front to rear torque ratio. The drive torque applied to the front and rear wheels is balanced dependent upon a header of a specific type or when the absence of header 22 becomes the configuration of combine 10.

The present invention includes the capability of shifting gears in transmission 34 as well as changing the displacement of hydraulic motor 28 to control the torque applied to wheels 14 and 16. This enables the operator to have the capability for traversing obstacles, like levies or hills, at low speed where high torque is required and then to drive faster on level ground while harvesting or transporting without stopping to shift gears and avoiding the slipping of wheels 14, 16, 18 and 20. For a given set of tire configurations and weight distribution the present invention changes the torque applied to the wheels to prevent combine 10 from being stuck and reducing wheel spin on combine 10.

The present invention commands the displacement of hydraulic motor 28, rear motors 30 and 32 and gear ratios of transmission 34 based on parameters sensed by sensor 42 as well as tire data 44. The information is available on the CAN bus of combine 10. Combine 10 is configured by factory personnel or by the dealer; a technician can input the tire configuration such as the size and presence or absence of duals installed on the combine. This information about tires also includes the rolling radius and footprint, which is needed to determine the tire/soil interaction capability inherent with that particular set of tires. When a header 22 is connected to combine 10 and when sensor 42 recognizes the type of header 22, such as a cornhead, chopping cornhead or a cutting platform, etc. This also determines the crop density that can be assumed will be going across header 22 as well as the header weight, both of which affect the weight distribution of combine 10. The tire and header data utilized by controller 40 is to determine how much torque can be applied to each axle without loss of traction. The front and rear motor displacement values and gear ratio for each axle could additionally be selected automatically to provide the optimal torque level to each axle.

The present invention allows for a feathering of the torque output to control and to enhance the traction of vehicle 10. In the event wheels spin, the hydraulic motors spinning those wheels can be de-stroked to allow the wheels to gain traction. The present invention allows the traction across the ground to take place with matched wheel slippage. Another advantage of the present invention is that it increases the efficiency of transit across a field by reducing fuel consumption. The present invention allows the matching of the displacement of hydraulic motors based on traction and weight distribution of combine 10. It is additionally contemplated that sensor 42 or other sensors give information to controller 40 to convey the attitude as well as acceleration of vehicle 10, which can alter the weight distribution on wheels 14, 16, 18 and 20 thereby allowing controller 40 to adjust the applied torque based upon these other sensed attributes of combine 10. Controller 40 selects appropriate torque curves based upon these inputs to control the torque supplied to wheels 14, 16, 18 and 20.

Having described the preferred embodiment, it will become apparent that various modifications can be made without departing from the scope of the invention as defined in the accompanying claims.

The invention claimed is:

1. An agricultural combine for supporting an agricultural header and carrying that agricultural header through a field to harvest a crop, the combine comprising:
   a chassis;
   front and rear drive wheels supporting said chassis;
   a hydraulic motor drivingly coupled to said front wheels;
   a device for sensing a presence of a header mounted to the combine;
   a controller configured to monitor the device for sensing and to change the specific displacement of the hydraulic motor dependent upon the presence of the agricultural header; and
   wherein said device for sensing generates a signal representative of a detection of said presence of the agricultural header coupled to the agricultural combine, said controller being configured to responsively reduce the specific displacement of said hydraulic motor dependent upon said signal.

2. The agricultural combine of claim 1, wherein the device for sensing is a proximity sensor configured to sense said presence of the agricultural header.

3. The agricultural combine of claim 2, wherein said device for sensing is one of an RFID tag and a Hall effect device.

4. The agricultural combine of claim 1, wherein said device for sensing includes at least one electrical jumper configured to alter an electrical circuit that is coupled to said controller.

5. The agricultural combine of claim 1, wherein said controller includes an electronic control circuit configured to receive an electrical signal from said device for sensing and to responsively change a displacement of said hydraulic motor that is drivingly coupled to said front wheels of the combine.

6. The agricultural combine of claim 1, wherein said device for sensing generates a signal representative of a detection of a removal of the agricultural header from the agricultural combine, said controller being configured to increase the specific displacement of said hydraulic motor dependent upon said signal.

7. The agricultural combine of claim 1, wherein said controller is additionally configured to change the specific displacement of the hydraulic motor dependent upon tire configuration data.

8. The agricultural combine of claim 1, wherein said controller is additionally configured to change the specific displacement of the hydraulic motor dependent upon a determination of the configuration of the header supported by the agricultural combine.

9. A control system for an agricultural combine that carries an agricultural header, the combine including a chassis with front drive wheels and rear wheels coupled to the chassis, the combine having a hydraulic motor drivingly coupled to the front wheels, the control system comprising:
   a device for sensing a presence of the agricultural header mounted to the combine;
   a controller configured to monitor the device for sensing and to change the specific displacement of the hydraulic motor dependent upon the presence of the agricultural header; and
   wherein said device for sensing generates a signal representative of a detection of said presence of the agricultural header coupled to the agricultural combine, said controller being configured to responsively reduce the specific displacement of said hydraulic motor dependent upon said signal.

10. The control system of claim 9, wherein the device for sensing is a proximity sensor configured to sense said presence of the agricultural header.

11. The control system of claim 10, wherein said device for sensing is one of an RFID tag and a Hall effect device.

12. The control system of claim 9, wherein said device for sensing includes at least one electrical jumper configured to alter an electrical circuit that is coupled to said controller.

13. The control system of claim 9, wherein said controller includes an electronic control circuit configured to receive an electrical signal from said device for sensing and to responsively change a displacement of said hydraulic motor that is drivingly coupled to said front wheels of the combine.

14. The control system of claim 9, wherein said device for sensing generates a signal representative of a detection of a removal of the agricultural header from the agricultural combine, said controller being configured to increase the specific displacement of said hydraulic motor dependent upon said signal.

15. The control system of claim 9, wherein said controller is additionally configured to change the specific displacement of the hydraulic motor dependent upon tire configuration data.

16. The control system of claim 9, wherein said controller is additionally configured to change the specific displacement of the hydraulic motor dependent upon a determination of the configuration of the header supported by the agricultural combine.

17. A method for controlling the fraction of an agricultural combine, the method comprising the steps of:

producing a first signal by sensing a removal of an agricultural header from the combine;

increasing a specific displacement of a hydraulic motor, said hydraulic motor being configured to drive a front wheel of the combine in response to said first signal;

producing a second signal by sensing the addition of said agricultural header to the agricultural combine, and decreasing said specific displacement of said hydraulic motor in response to said second signal.

18. The method of claim 17, further comprising the step of altering said specific displacement of said hydraulic motor dependent upon tire configuration data.

* * * * *

UNITED STATES PATENT AND TRADEMARK OFFICE
CERTIFICATE OF CORRECTION

PATENT NO. : 7,748,489 B2  Page 1 of 1
APPLICATION NO. : 12/262901
DATED : July 6, 2010
INVENTOR(S) : Alan Sheidler et al.

It is certified that error appears in the above-identified patent and that said Letters Patent is hereby corrected as shown below:

IN THE CLAIMS:

COLUMN 7, CLAIM 17
 Line 13, after "controlling the" please delete "fraction" and insert --traction--.

Signed and Sealed this

Thirtieth Day of November, 2010

David J. Kappos
*Director of the United States Patent and Trademark Office*